United States Patent
Kurematsu et al.

(10) Patent No.: US 11,499,620 B2
(45) Date of Patent: Nov. 15, 2022

(54) SPROCKET AND DRIVE MECHANISM

(71) Applicant: TSUBAKIMOTO CHAIN CO., Osaka (JP)

(72) Inventors: Yuji Kurematsu, Osaka (JP); Yudai Takagi, Osaka (JP); Yuki Mizuno, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 352 days.

(21) Appl. No.: 16/661,128

(22) Filed: Oct. 23, 2019

(65) Prior Publication Data

US 2020/0158223 A1 May 21, 2020

(30) Foreign Application Priority Data

Nov. 19, 2018 (JP) .............................. JP2018-216237

(51) Int. Cl.
| | |
|---|---|
| *F16H 55/30* | (2006.01) |
| *F16H 55/08* | (2006.01) |
| *F16H 7/06* | (2006.01) |
| *F16H 55/16* | (2006.01) |
| *F16H 57/00* | (2012.01) |

(52) U.S. Cl.
CPC .............. *F16H 55/30* (2013.01); *F16H 7/06* (2013.01); *F16H 55/08* (2013.01); *F16H 55/16* (2013.01); *F16H 57/0006* (2013.01)

(58) Field of Classification Search
CPC . F16H 55/30; F16H 7/06; F16H 55/08; F16H 55/16; F16H 57/0006
USPC ......................................................... 474/155
See application file for complete search history.

(56) References Cited

U.S. PATENT DOCUMENTS

| | | | | |
|---|---|---|---|---|
| 2003/0087714 A1* | 5/2003 | Todd | ...................... | F16H 55/30 474/202 |
| 2009/0170648 A1 | 7/2009 | Nakano et al. | | |
| 2009/0286639 A1* | 11/2009 | Sakura | .................... | F16H 55/30 474/152 |
| 2010/0160098 A1* | 6/2010 | Sonoda | ................... | F16H 55/30 474/101 |
| 2010/0227720 A1* | 9/2010 | Mehta | ..................... | F16H 55/30 474/155 |
| 2011/0245002 A1* | 10/2011 | Young | ...................... | F16H 7/06 474/157 |

FOREIGN PATENT DOCUMENTS

| | | |
|---|---|---|
| JP | S52-027307 B1 | 7/1977 |
| JP | 2009-156320 A | 7/2009 |

* cited by examiner

*Primary Examiner* — Gene O Crawford
*Assistant Examiner* — Emily R Kincaid
(74) *Attorney, Agent, or Firm* — WHDA, LLP

(57) ABSTRACT

To provide a sprocket that reduces the influence of tension fluctuations concurrent with load torque variations to suppress noise and vibration, and that prevents an increase in tension fluctuations, noise, and vibration even when the chain tension is low and the load torque is small, and in regions where engagement between the chain and sprocket is free of the influence of tension. The sprocket has a plurality of seating points for the chain when the chain sits under no load set between adjacent pairs of the teeth such that their radial positions change in a circumferentially continuous manner. The radial positions of the seating points under no load have a variation pattern in which the radial positions increase and decrease depending on circumferential positions of the seating points.

4 Claims, 5 Drawing Sheets

SPROCKET AND DRIVE MECHANISM

BACKGROUND OF THE INVENTION

1. Field of the Invention

The present invention relates to a sprocket having a plurality of teeth that mate with a chain, and to a drive system.

2. Description of the Related Art

Drive systems with a chain put around sprockets having a plurality of teeth on the circumferential surface of their main bodies have been commonly used as a mechanism for reliably transmitting rotation.

While the rotational force is reliably transmitted from one sprocket to another at given timing as the sprocket teeth mate with the chain, noise and vibration inevitably accompany the sprocket/chain engagement.

For a drive system where the load torque varies periodically with the rotation, a sprocket that reduces noise and vibration by alleviating the influence of tension fluctuations concurrent with the load torque variations is known (see, for example, Japanese Patent Application Laid-open No. 2009-156320). In order to reduce tension fluctuations in sync with periodic variations of the load torque, the sprocket teeth are arranged such that there is a phase variation pattern wherein the phase of engagement between the teeth and the chain is alternately advanced and retarded relative to a zero position where equidistant teeth would be in phase with the chain.

SUMMARY OF THE INVENTION

With the known sprocket, it is possible to suppress noise caused by vibration of the chain by reducing tension fluctuations. However, because of the periodic nature of the load torque variation, order noises corresponding to the periods would still be generated.

There are also possibilities of tension fluctuations becoming larger, or of increased noise and vibration, contrary to the intention, if there is a shift in the phase of the load torque variation, or when resonance occurs depending on the relationship between the rotation number of the sprocket and the inherent frequency of the chain.

When the chain tension is low so that the load torque is small, or in regions where the chain and sprocket engage without being affected by the tension, the sprocket shape, or the teeth of the sprocket being arranged such that there is a phase variation pattern may cause tension fluctuations of the chain, vibration, and noise, contrary to the intention.

An object of the present invention is to solve these problems and to provide a sprocket that reduces the influence of tension fluctuations concurrent with load torque variations to suppress noise and vibration, and that suppresses an increase in tension fluctuations, noise, and vibration even when the chain tension is low and the load torque is small, and in regions where engagement between the chain and sprocket is free of the influence of tension.

The present invention achieves the above object by providing a sprocket including a plurality of teeth that mate with a chain, wherein the plurality of teeth are formed such that positions of a plurality of no-load seating points in radial direction of the sprocket change in a circumferentially continuous manner, wherein the no-load seating points denote positions at which the chain sits under no load between adjacent pairs of the teeth, and the positions in the radial direction of the no-load seating points have a variation pattern in which the radial positions increase and decrease depending on circumferential positions of the seating points.

According to the sprocket set forth in claim 1, the actual seating points, and in turn the pitch line of the mating chain, change depending on the radial positions of the no-load seating points and the load torque by the feature in which the plurality of teeth are formed such that positions of a plurality of no-load seating points in radial direction of the sprocket change in a circumferentially continuous manner, wherein the no-load seating points denote positions at which the chain sits under no load between adjacent pairs of the teeth, and the positions in the radial direction of the no-load seating points have a variation pattern in which the radial positions increase and decrease depending on circumferential positions of the seating points.

This pitch line change becomes more evident as the load torque increases. It is thus possible to dynamically cancel torque variations to reduce the influence of tension fluctuations, whereby noise and vibration can be suppressed.

Since the plurality of no-load seating points are varied in position in the radial direction with a pattern of increase and decrease depending on the circumferential position, the pitch line change can be varied under the same load torque, so that resonance that may occur depending on the relationship between the rotation number of the sprocket and the inherent frequency of the chain is suppressed, and a possible increase in tension fluctuations, vibration, or noise can be suppressed.

According to the configuration set forth in claim 2, the no-load seating points are tooth roots between adjacent pairs of the teeth, which is suited for use with a bushing chain, a roller chain, or a silent chain in which the tips of plate teeth would sit on the seating points.

According to the configuration set forth in claim 3, the variation pattern includes a repeated cycle of increase and decrease, and the cycle of increase and decrease circumferentially reduces or increases continuously. This way, the timing of any phase advance or delay of the cycle of load torque variations relative to the cycle of increase and decrease can be smoothly shifted, and also, generation of order noises can be mitigated.

According to the configuration set forth in claim 4, the variation pattern includes a repeated cycle of increase and decrease, and the cycle of increase and decrease contains a portion identical to that of a major cycle of torque variation. This way, the influence on torque variations, which are the main cause of noise and vibration, can be effectively suppressed.

According to the configuration set forth in claim 5, the plurality of no-load seating points are set such that angular phases thereof change in a circumferentially continuous manner. This way, the mating timing can be evened out more effectively, and order noises can be further reduced.

According to the configuration set forth in claim 6, the change in the angular phases and the variation pattern of the positions in the radial direction of the plurality of the no-load seating points are set such as to conform to a pitch of the chain when the chain sits on the plurality of no-load seating points. Thus, the seating positions are made consistent when the chain tension is low and the load torque is small, or in regions where engagement between the chain and sprocket is free of the influence of tension, so that tension fluctuations, vibration, and noise originating from the sprocket can be reduced even more.

DESCRIPTION OF THE PREFERRED EMBODIMENT

The sprocket of the present invention includes a plurality of teeth that mate with a chain, and may have any specific configuration as long as the sprocket has a structure wherein the plurality of teeth are formed such that positions of a plurality of no-load seating points in radial direction of the sprocket change in a circumferentially continuous manner, wherein the no-load seating points denote positions at which the chain sits under no load between adjacent pairs of the teeth, and the positions in the radial direction of the no-load seating points have a variation pattern in which the radial positions increase and decrease depending on circumferential positions of the seating points.

The chain to be put around the sprocket may be any chain such as a silent chain, a roller chain, a bushing chain, and the like, or may be any other flexible drive member such as a timing belt that is configured to mesh with the teeth of a sprocket.

The sprocket 100 that is one embodiment of the present invention will be described with reference to the drawings.

Figure 1:
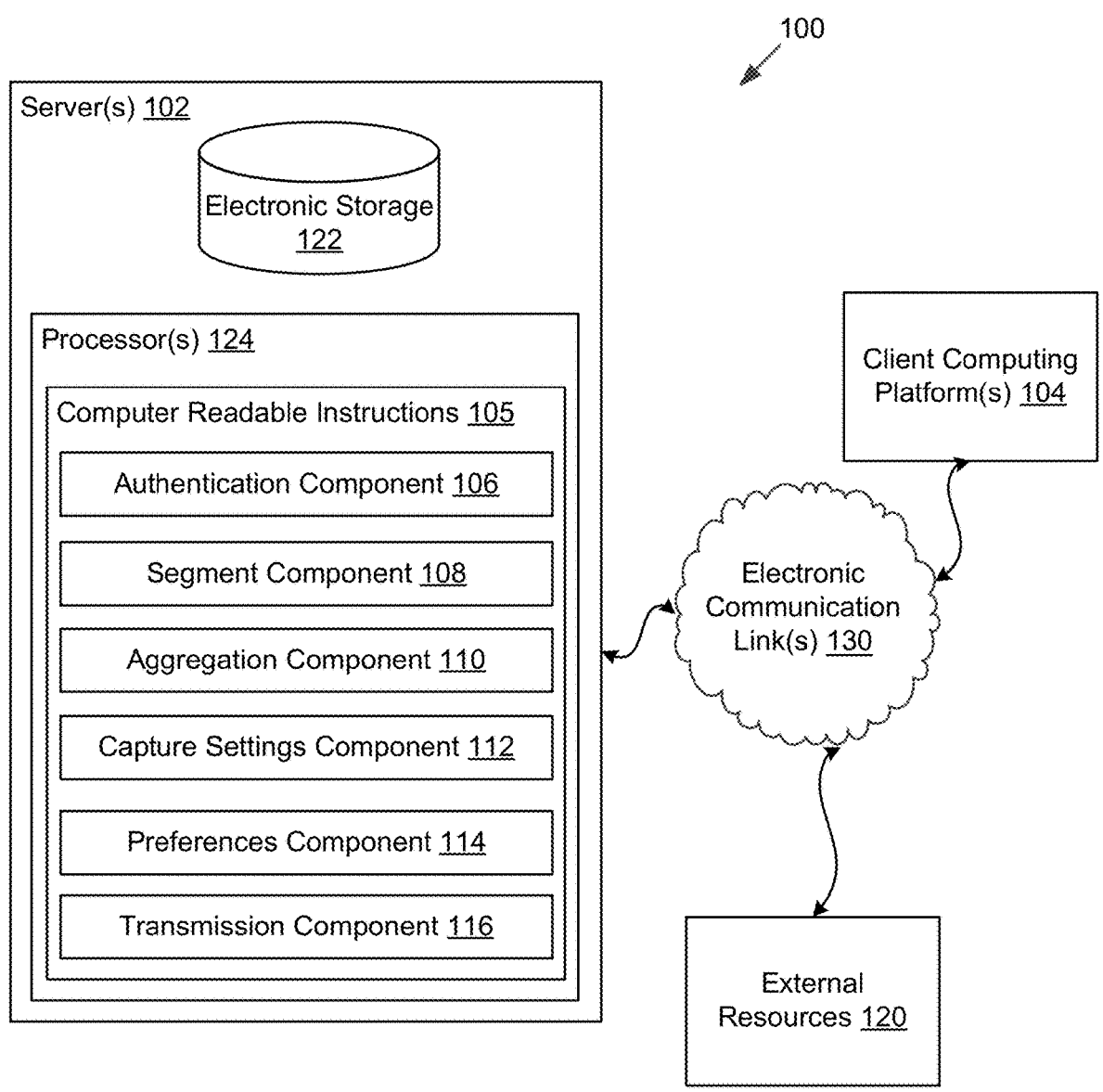
FIG. 1 is an illustrative diagram showing a side face of a sprocket according to one embodiment of the present invention.

As shown in FIG. 1, the sprocket 100 has a plurality of teeth 101 that mesh with a chain, i.e., in this embodiment, with rollers R of a roller chain. Between each adjacent pair of teeth, the tooth root 102 is formed.

When the chain is mated with the sprocket 100 under no load, a roller R of the chain sits on each tooth root 102.

A common toothed sprocket has each tooth root 102 positioned on the tooth root circle D around the rotation center of the sprocket. Meanwhile, according to the present invention, the plurality of tooth roots 102 of the sprocket are varied in radial position in accordance with their circumferential positions in an increasing and decreasing pattern as shown in FIG. 1, i.e., some of the tooth roots 102 are positioned radially away from the tooth root circle D by a tooth root displacement (d2, d3, d4, . . . ).

Figure 2:
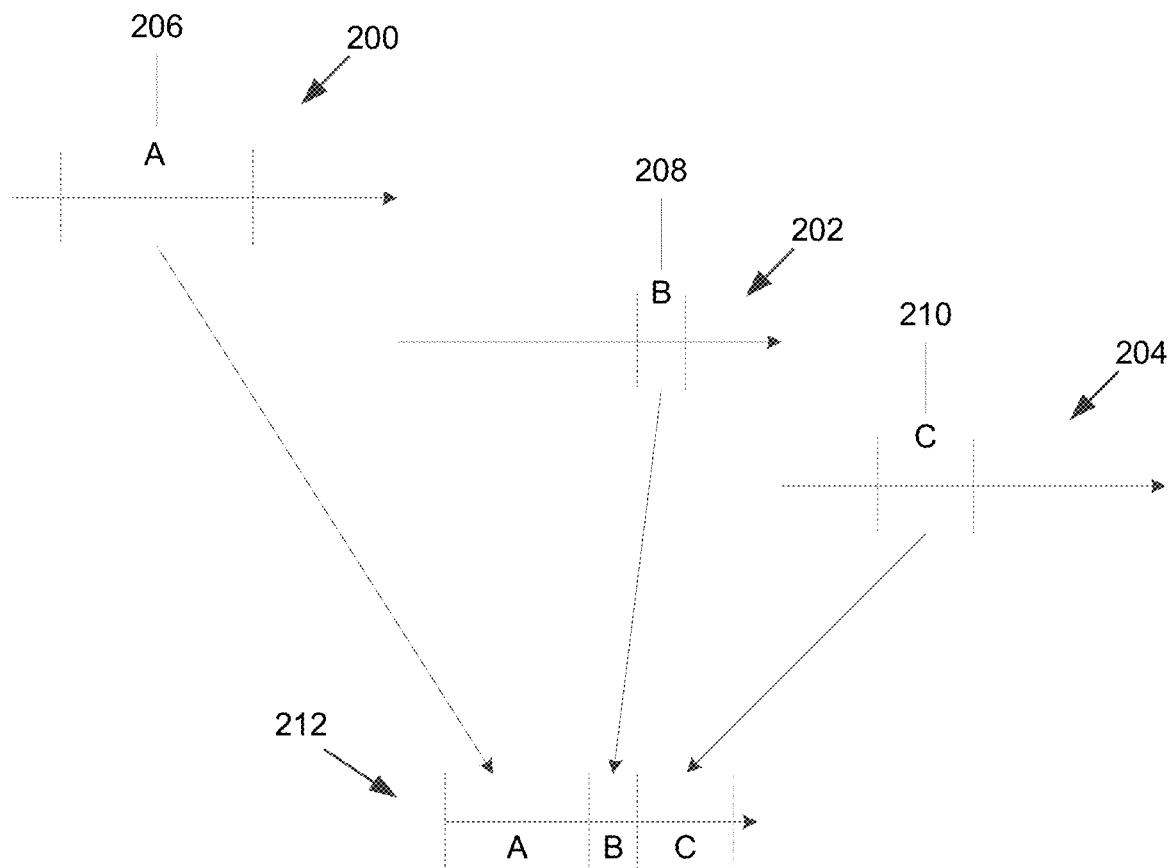
FIG. 2 is a diagram for explaining a varying pattern of positions in the radial direction, and changes in the angular phase, of a plurality of tooth roots of the sprocket according to one embodiment of the present invention.
Figure 3:
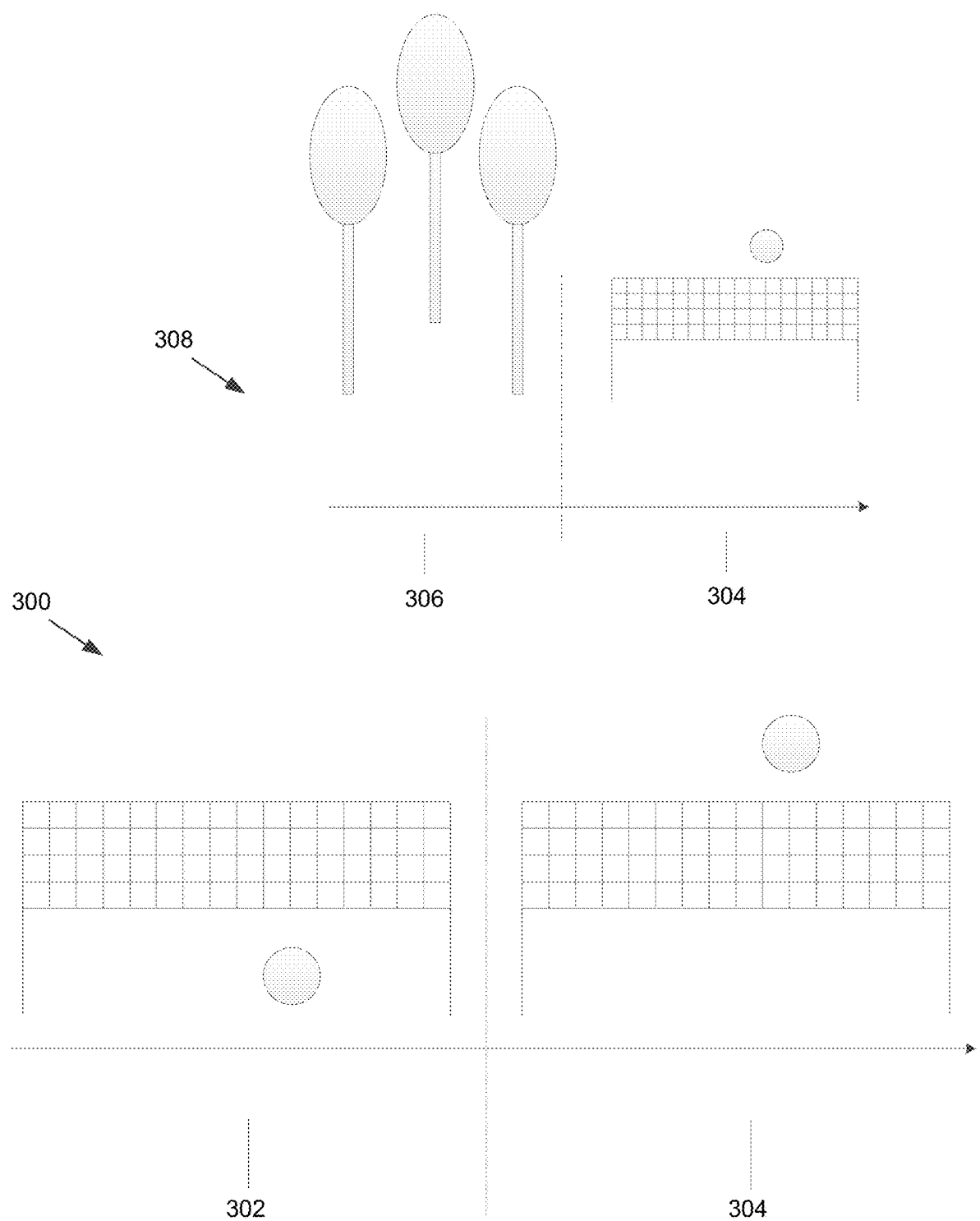
Figure 4:
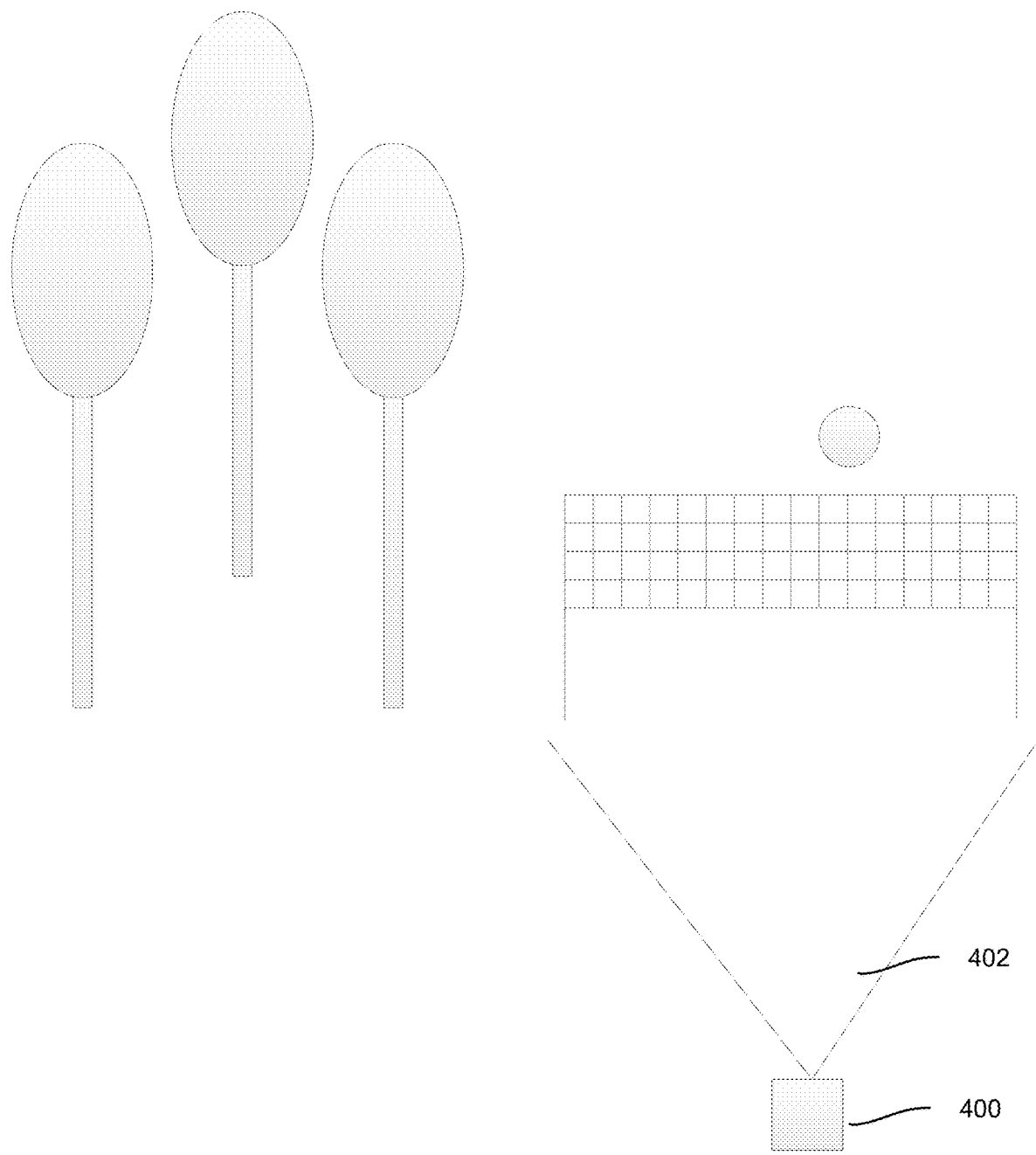
Figure 5:
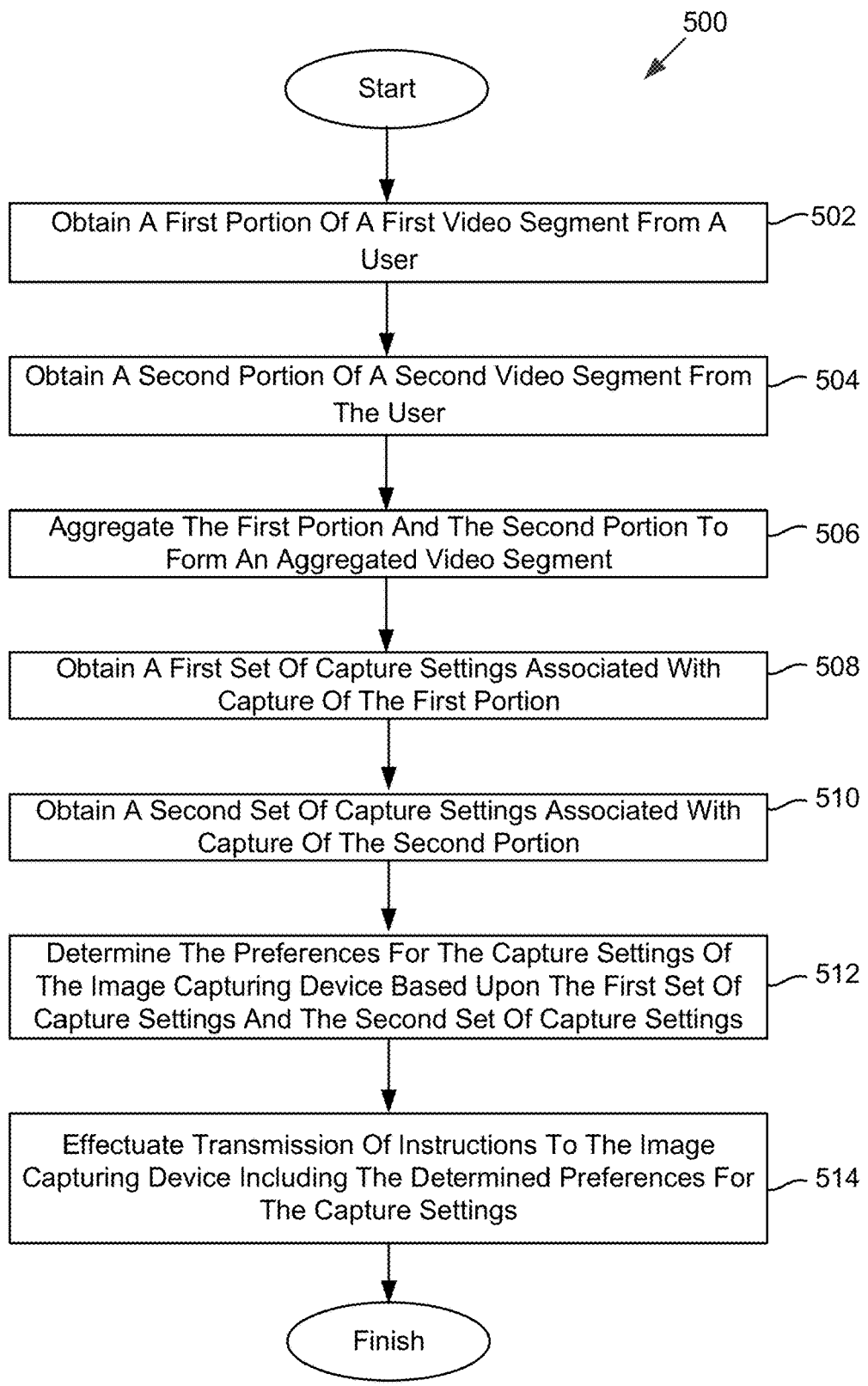
Figure 1:
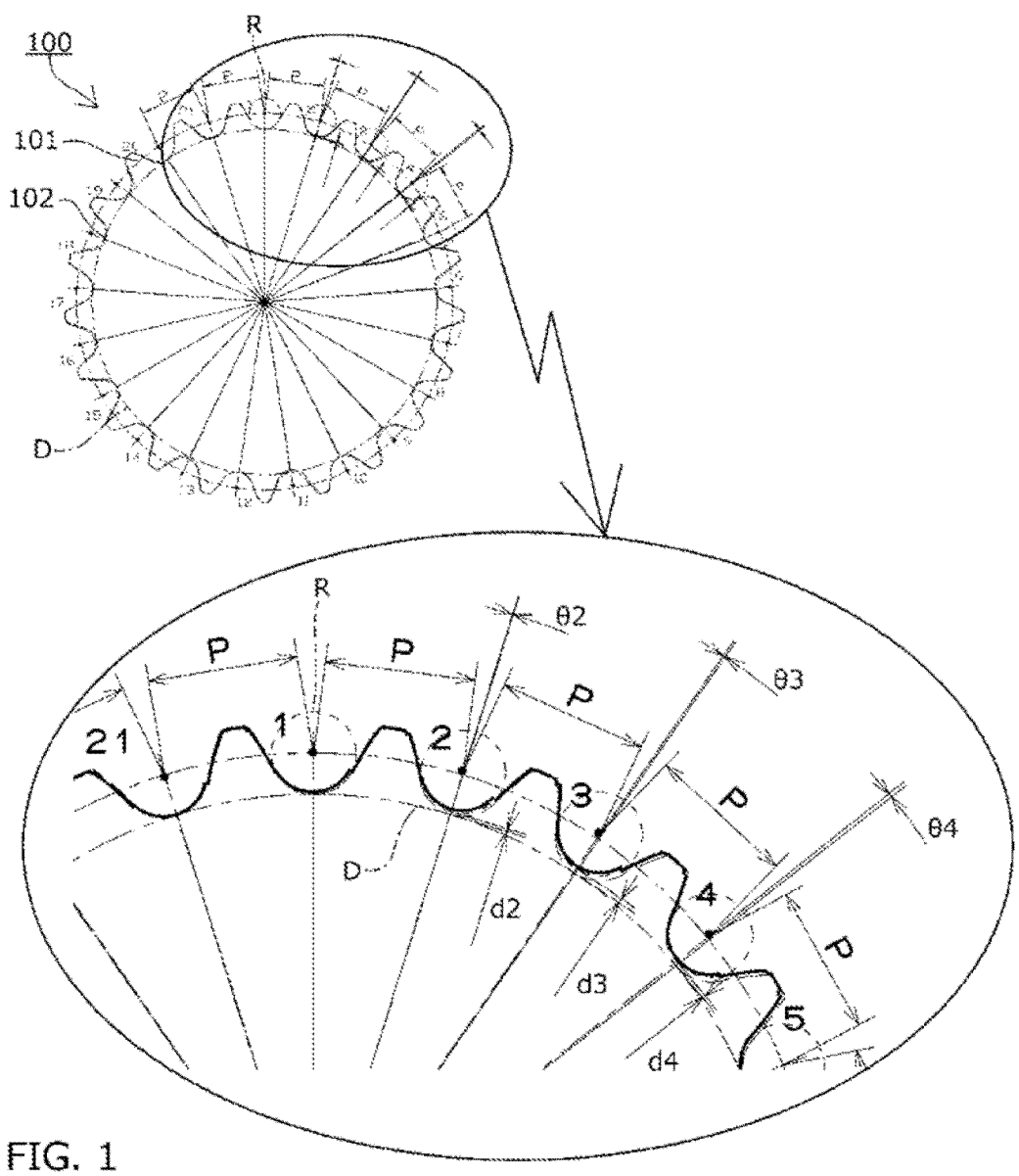
Figure 2:
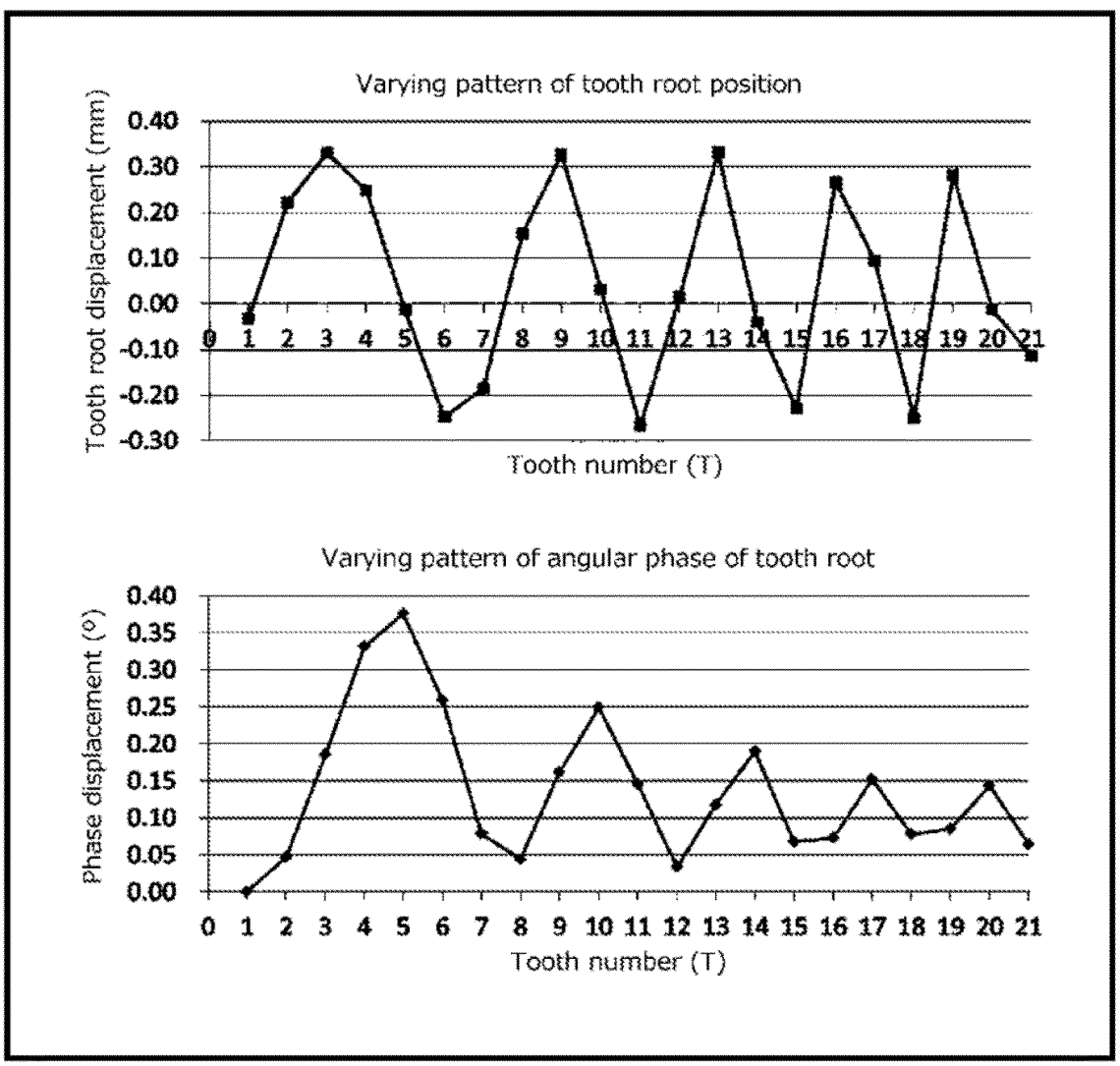

The varying pattern of the tooth root displacement (d2, d3, d4, . . . ) increasing and decreasing in accordance with the circumferential position is configured to repeat itself multiple times such that the cycle of increase and decrease continuously reduces in a circumferential direction as shown in FIG. 2.

In the present embodiment, when adjacent tooth roots 102 differ slightly in their radial position due to the varying pattern of the root displacement (d2, d3, d4, . . . ) increasing and decreasing in accordance with the circumferential position, the pitch P of the rollers R of the chain when the rollers R sit on the tooth roots would not match the tooth pitch. However, in this embodiment, as shown in FIG. 2, each tooth root 102 is positioned such that its angular phase is changed circumferentially continuously with a phase displacement ($\theta2, \theta3, \theta4, \ldots$) so that the distance between each adjacent pair of tooth roots 102 is adjusted and the pitch P of the chain rollers R matches the tooth pitch when the chain rollers R sit on the tooth roots.

The effects of the sprocket 100 configured as described above will be explained.

As mentioned above, under no load, the rollers R of the chain sit on the tooth roots 102 of the sprocket 100, and when the load is small, the rollers R mesh with the teeth of the sprocket 100 very close to the tooth roots 102 because the tooth roots 102 are provided at an equal pitch, so that rotation irregularity of the chain is reduced and transmission efficiency can be increased. Thus, tension fluctuations, vibration, and noise originating from the sprocket 100 are reduced.

When the chain tension rises, the rollers R sit on the teeth at a point away from the tooth roots 102 as they transmit torque rather than at the tooth roots 102 which are the seating points of the rollers under no load, so that the chain is lifted in the radially outward direction of the sprocket 100.

The sprocket of the present invention includes tooth roots 102 positioned radially away from the tooth root circle D by a tooth root displacement (d2, d3, d4, . . . ) so that the amount by which the chain is lifted radially outward when loaded is varied. This way, the order noises can be reduced as with when the sprocket has a varying mating pitch.

The root displacement (d2, d3, d4, . . . ) is changed gradually in accordance with the circumferential position in a varying pattern of decrease and increase continuously in the circumferential direction. Thereby, tension fluctuations can be reduced as with when the mating pitch is varied in accordance with the chain tension fluctuations. The varying pattern may contain a wavelength identical to that of major torque variations, which will be particularly effective in an application where the cause of torque variations is known beforehand such as an engine or the like.

In the description above, the tooth roots 102 are the seating points of rollers R of a roller chain. In the case with a silent chain, tips of plates of the chain would be seated on the tooth roots 102 of the sprocket 100 under no load.

When inner flanks or outer flanks of plates of the silent chain sit on no-load seating points between the teeth of the sprocket, it would be these seating points that need to be positioned similarly to the tooth roots as has been described above.

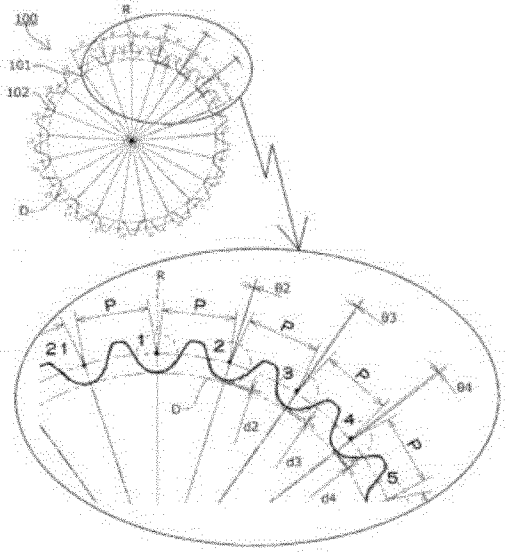

What is claimed is:

1. A sprocket comprising:
a plurality of teeth that mate with a chain, wherein
the plurality of teeth are formed such that positions of a plurality of no-load seating points in radial direction of the sprocket change in a circumferentially continuous manner, wherein the no-load seating points denote positions at which the chain sits under no load between adjacent pairs of the teeth,
the positions in the radial direction of the no-load seating points have a variation pattern in which the radial positions increase and decrease depending on circumferential positions of the seating points,
the variation pattern includes a repeated cycle of increase and decrease,
the cycle of increase and decrease circumferentially reduces or increases continuously,
the plurality of no-load seating points are set such that angular phases thereof change in a circumferentially continuous manner, and
change in the angular phases and the variation pattern of the positions in the radial direction of the plurality of the no-load seating points are set such as to conform to a pitch of the chain when the chain sits on the plurality of no-load seating points.

2. The sprocket according to claim 1, wherein
the sprocket comprises a plurality of teeth that mate with a chain, and
the no-load seating points are tooth roots between adjacent pairs of the teeth.

3. The sprocket according to claim 1, wherein the cycle of increase and decrease contains a portion identical to a major cycle of torque variation.

4. A drive mechanism comprising: the sprocket according to claim 1; a shaft to which the sprocket is attached; and a chain put around the sprocket.

* * * * *

UNITED STATES PATENT AND TRADEMARK OFFICE
CERTIFICATE OF CORRECTION

PATENT NO. : 11,499,620 B2
APPLICATION NO. : 16/661128
DATED : November 15, 2022
INVENTOR(S) : Yuji Kurematsu et al.

It is certified that error appears in the above-identified patent and that said Letters Patent is hereby corrected as shown below:

On the Title Page

Please delete the Title Page and substitute therefor with the attached Title Page consisting of the corrected illustrative figure.

In the Drawings

Please delete Drawing Sheets 1-5 and replace with corrected Drawing Sheets 1-2, consisting of FIGS. 1-2 as shown on the attached pages.

Signed and Sealed this
Twelfth Day of March, 2024

*Katherine Kelly Vidal*

Katherine Kelly Vidal
*Director of the United States Patent and Trademark Office*

(12) United States Patent
Kurematsu et al.

(10) Patent No.: US 11,499,620 B2
(45) Date of Patent: Nov. 15, 2022

(54) SPROCKET AND DRIVE MECHANISM

(71) Applicant: TSUBAKIMOTO CHAIN CO., Osaka (JP)

(72) Inventors: Yuji Kurematsu, Osaka (JP); Yudai Takagi, Osaka (JP); Yuki Mizuno, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 352 days.

(21) Appl. No.: 16/661,128

(22) Filed: Oct. 23, 2019

(65) Prior Publication Data
US 2020/0158223 A1 May 21, 2020

(30) Foreign Application Priority Data
Nov. 19, 2018 (JP) .................. JP2018-216237

(51) Int. Cl.
*F16H 55/30* (2006.01)
*F16H 55/08* (2006.01)
*F16H 7/06* (2006.01)
*F16H 55/16* (2006.01)
*F16H 57/00* (2012.01)

(52) U.S. Cl.
CPC .......... *F16H 55/30* (2013.01); *F16H 7/06* (2013.01); *F16H 55/08* (2013.01); *F16H 55/16* (2013.01); *F16H 57/0006* (2013.01)

(58) Field of Classification Search
CPC .. F16H 55/30; F16H 7/06; F16H 55/08; F16H 55/16; F16H 57/0006
USPC .................................................. 474/155
See application file for complete search history.

(56) References Cited

U.S. PATENT DOCUMENTS

| | | | |
|---|---|---|---|
| 2003/0087714 A1* | 5/2003 | Todd | F16H 55/30 474/202 |
| 2009/0170648 A1 | 7/2009 | Nakano et al. | |
| 2009/0286639 A1* | 11/2009 | Sakura | F16H 55/30 474/152 |
| 2010/0160098 A1* | 6/2010 | Sonoda | F16H 55/30 474/101 |
| 2010/0227720 A1* | 9/2010 | Mehta | F16H 55/30 474/155 |
| 2011/0245002 A1* | 10/2011 | Young | F16H 7/06 474/157 |

FOREIGN PATENT DOCUMENTS

JP S52-027307 B1 7/1977
JP 2009-156320 A 7/2009

* cited by examiner

Primary Examiner — Gene O Crawford
Assistant Examiner — Emily R Kincaid
(74) Attorney, Agent, or Firm — WHDA, LLP

(57) ABSTRACT

To provide a sprocket that reduces the influence of tension fluctuations concurrent with load torque variations to suppress noise and vibration, and that prevents an increase in tension fluctuations, noise, and vibration even when the chain tension is low and the load torque is small, and in regions where engagement between the chain and sprocket is free of the influence of tension. The sprocket has a plurality of seating points for the chain when the chain sits under no load set between adjacent pairs of the teeth such that their radial positions change in a circumferentially continuous manner. The radial positions of the seating points under no load have a variation pattern in which the radial positions increase and decrease depending on circumferential positions of the seating points.

4 Claims, 2 Drawing Sheets